US012594508B2

(12) United States Patent
Sakai

(10) Patent No.: US 12,594,508 B2
(45) Date of Patent: Apr. 7, 2026

(54) CREATION TABLE FOR FUSIBLE TOY BEAD

(71) Applicant: EPOCH COMPANY, LTD., Tokyo (JP)

(72) Inventor: Ryo Sakai, Tokyo (JP)

(73) Assignee: EPOCH COMPANY, LTD., Tokyo (JP)

( * ) Notice: Subject to any disclaimer, the term of this patent is extended or adjusted under 35 U.S.C. 154(b) by 37 days.

(21) Appl. No.: 18/650,630

(22) Filed: Apr. 30, 2024

(65) Prior Publication Data

US 2024/0367068 A1 Nov. 7, 2024

(30) Foreign Application Priority Data

May 1, 2023 (JP) ................................ 2023-075452

(51) Int. Cl.
*A63H 33/00* (2006.01)
*A63H 33/08* (2006.01)
*B44C 3/12* (2006.01)

(52) U.S. Cl.
CPC ........... *A63H 33/001* (2013.01); *A63H 33/08* (2013.01); *B44C 3/12* (2013.01)

(58) Field of Classification Search
USPC ...... D19/40, 59, 60, 62, 108, 111, 113, 114; D21/469
See application file for complete search history.

(56) References Cited

U.S. PATENT DOCUMENTS

| | | | | |
|---|---|---|---|---|
| 1,678,966 A * | 7/1928 | Whiting | B44C 3/12 269/40 |
| 10,328,356 B1 * | 6/2019 | Harper | B44C 1/28 |
| D891,513 S * | 7/2020 | Sakai | D19/111 |
| D922,485 S * | 6/2021 | Sakai | D19/111 |

(Continued)

FOREIGN PATENT DOCUMENTS

| | | |
|---|---|---|
| JP | 2015-181915 A | 10/2015 |
| JP | 2018-191839 A | 12/2018 |

(Continued)

OTHER PUBLICATIONS

Search Report issued on Apr. 10, 2025 in corresponding Spanish patent application No. 202430340.

(Continued)

*Primary Examiner* — Emmanuel S Luk
(74) *Attorney, Agent, or Firm* — Faegre Drinker Biddle & Reath LLP

(57) ABSTRACT

A creation table for fusible toy bead includes: a first table having a plurality of through holes extending in a penetrating direction and configured to allow fusible toy beads; and a second table including: a plurality of pins configured to be inserted into and removed from the plurality of through holes; and a sheet holding portion configured to hold a sheet. The plurality of through holes include at least one through hole group, and each of the at least one through hole group has two or more through holes. The first table has a communication groove penetrating through the first table in the penetrating direction such that adjacent through holes contained in each of the at least one through hole group communicate with each other in a radial direction of the adjacent through holes.

6 Claims, 5 Drawing Sheets

(56) References Cited

U.S. PATENT DOCUMENTS

| | | | | |
|---|---|---|---|---|
| D923,090 | S * | 6/2021 | Sakai | D19/111 |
| D987,721 | S * | 5/2023 | Sakai | D19/111 |
| 2012/0186748 | A1* | 7/2012 | Kamiyama | A63H 9/00 156/349 |
| 2013/0236679 | A1* | 9/2013 | Bizzotto | B23P 11/00 29/428 |
| 2016/0354705 | A1* | 12/2016 | Poulus | A63H 33/04 |
| 2018/0333653 | A1* | 11/2018 | Sakai | A63H 33/06 |
| 2019/0336880 | A1 | 11/2019 | Sakai | |
| 2021/0283522 | A1 | 9/2021 | Sakai | |
| 2024/0238690 | A1* | 7/2024 | Sakai | A63H 33/14 |
| 2024/0367070 | A1* | 11/2024 | Sakai | A63H 33/06 |

FOREIGN PATENT DOCUMENTS

| | | | |
|---|---|---|---|
| KR | 2011-0005646 | U | 6/2011 |
| KR | 102041724 | B1 | 11/2019 |

OTHER PUBLICATIONS

British Search Report issued Oct. 8, 2024 in Application No. GB2406104.6.

French Search Report issued Dec. 3, 2025 in Application No. 2404503.

* cited by examiner

CREATION TABLE FOR FUSIBLE TOY BEAD

CROSS-REFERENCE TO RELATED APPLICATIONS

This application is based on and claims priority under 35 USC 119 from Japanese Patent Application No. 2023-075452 filed on May 1, 2023, the contents of which are incorporated herein by reference.

TECHNICAL FIELD

The present disclosure relates to a creation table for fusible toy bead.

BACKGROUND ART

JP2018-191839A discloses a creation table for fusible toy bead allowing an assembly of fusible toy beads placed on the creation table for fusible toy bead to be removed before completely dried out so as to create a next assembly of fusible toy beads. The creation table for fusible toy bead includes a table on which fusible toy beads are arranged, and a receiver configured to be inverted together with the table and including a receiving surface that receives, moves, and dries the arranged fusible toy beads. A plurality of through holes for placing fusible toy beads are formed in the table.

SUMMARY OF INVENTION

In the creation table for fusible toy bead as disclosed in JP2018-191839A, when a user places fusible toy beads on the table to create a design, the user may hold a sheet such as paper on which the design or the like is illustrated on a lower surface side of the table and place the fusible toy beads according to the design on the sheet that can be seen through the table. However, in the creation table for fusible toy bead of JP2018-191839A, since the through holes formed in the table are separated from each other, it may be difficult to see the sheet on the lower surface side from an upper surface side in an area where the through holes are not formed, and it may be difficult to place the fusible toy beads according to the design.

An object of the present disclosure is to provide a creation table for fusible toy bead on which fusible toy beads are easily placed according to a design.

The present disclosure provides a creation table for fusible toy bead including: a first table having a plurality of through holes extending in a penetrating direction and configured to allow fusible toy beads to be placed on one side of the plurality of through holes in the penetration direction; and a second table including: a plurality of pins configured to be inserted into and removed from the plurality of through holes from another side of the plurality of through holes in the penetration direction; and a sheet holding portion configured to hold a sheet, in which: the plurality of through holes include at least one through hole group, each of the at least one through hole group having two or more through holes; and the first table has a communication groove penetrating through the first table in the penetrating direction such that adjacent through holes contained in each of the at least one through hole group communicate with each other in a radial direction of the adjacent through holes.

According to the present disclosure, it is possible to provide a creation table for fusible toy bead on which fusible toy beads are easily placed according to a design.

BRIEF DESCRIPTION OF DRAWINGS

The present disclosure will be described in detail based on the following without being limited thereto, wherein.

DESCRIPTION OF EMBODIMENTS

Figure 1:
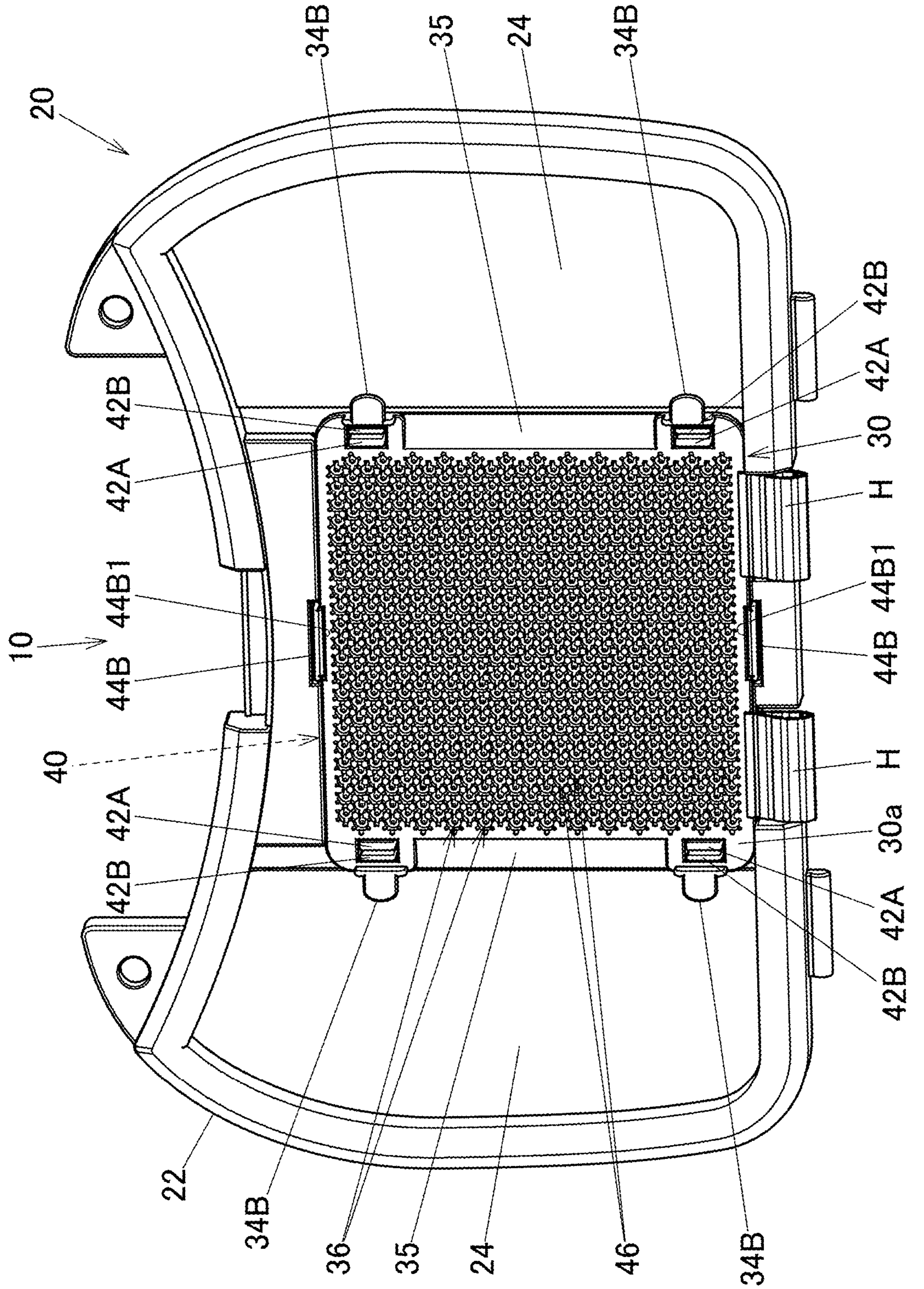
FIG. 1 is a perspective view of a creation table for fusible toy bead according to an embodiment of the present disclosure as viewed from above.
Figure 2:
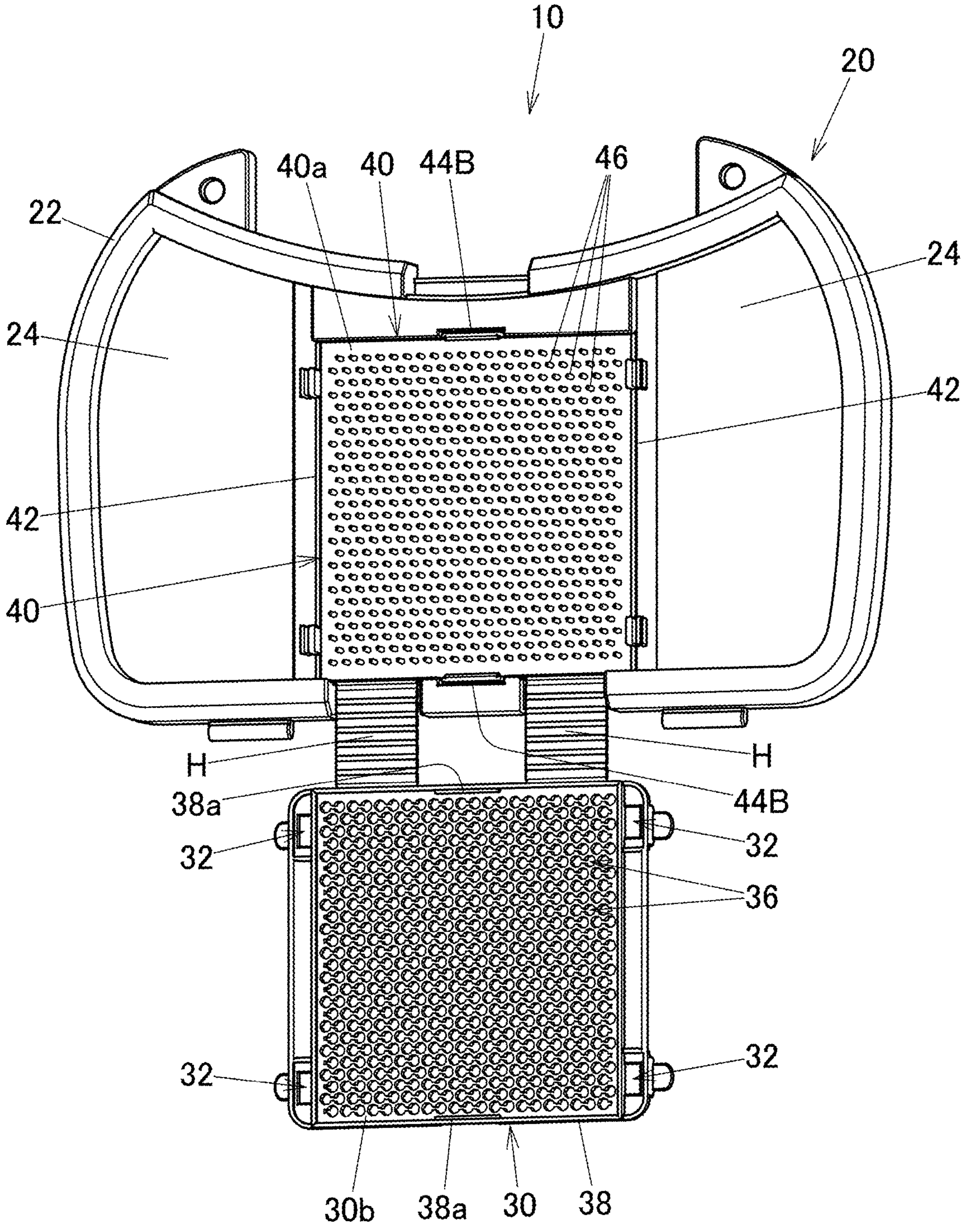
FIG. 2 is a perspective view of the creation table for fusible toy bead according to the embodiment of the disclosure with a first table opened and viewed from above.

An embodiment of the present disclosure will be described with reference to the drawings. As shown in FIGS. 1 and 2, a creation table for fusible toy bead (fusible toy bead creation table) 10 according to the embodiment of the present disclosure includes a main body portion 20, a first table 30, and a second table 40. The first table 30 is connected to the second table 40 via a pair of hinges H. The second table 40 is provided on the main body portion 20. The fusible toy bead creation table 10 is integrally molded by injection molding of a transparent resin material (for example, polypropylene), and the main body portion 20 and the first table are formed in a substantially plate shape. Both the first table 30 and the second table 40 are formed in a substantially square shape and have substantially the same size. The first table 30 can be stacked on the second table 40 by bending the pair of hinges H.

Hereinafter, a state in which the pair of hinges H are bent and the first table 30 is stacked on (close to) the second table 40 is referred to as a "closed state of the first table 30", and a state in which the first table 30 is separated from the second table 40 without bending the pair of hinges H is referred to as an "opened state of the first table 30". In the following description, a side on which the first table 30 overlaps the second table 40 is referred to as an upper side, and an opposite side thereof is referred to as a lower side; a side on which the hinges H are provided when the fusible toy bead creation table 10 is viewed from above is referred to as a front side, and an opposite side thereof is referred to as a rear side; and a right side when the fusible toy bead creation table 10 is viewed from the front side is referred to as a right side, and the opposite side thereof is referred to as a left side.

A plurality of fusible toy beads can be placed on an upper surface 30*a* of the first table 30. The fusible toy bead creation table 10 is a toy that is played by arranging the plurality of fusible toy beads according to various designs or the like and combining the fusible toy beads to each other by spraying water with a sprayer or the like. Sheet holding plates (sheet holding portion) 48A and sheet holding ribs (sheet holding portion) 48B to be described later are provided on a lower surface 40*b* of the second table 40 (see FIG. 3), so that a sheet, such as paper, on which a design and the like are illustrated can be held. The design on the sheet held by the sheet holding plates 48A and the sheet holding ribs 48B can be seen from above the first table 30 through the second table 40 and the first table 30. Accordingly, a user can arrange the fusible toy bead according to the design on the sheet held by the sheet holding plates 48A and the sheet holding ribs 48B.

The fusible toy bead placed on the first table 30 is made of a resin, which is a water-soluble material. Specifically, the fusible toy bead is made by blending polyvinyl alcohol with a resin and kneading them. The resin forming the fusible toy bead can be formed by appropriately selecting a transparent material, a translucent material, or an opaque material. The fusible toy bead may be in various shapes such as a spherical shape or a polygonal shape.

First, the configuration of the main body portion 20 will be described. As shown in FIG. 2, the main body portion 20 is a horizontally elongated substantially rectangular plate-shaped member whose rear end portion is formed in a substantially convex arc shape toward the inside, and is provided with a substantially annular frame portion 22 formed at an outer edge portion and having a larger thickness than other regions. The second table 40 and a pair of drying tables 24 are provided inside the main body portion 20 surrounded by the frame portion 22. The second table 40 is provided in a substantially square shape at a central portion in a left-right direction of the main body portion 20, and the pair of drying tables 24 are provided on both left and right sides of the second table 40, respectively.

Figure 5:
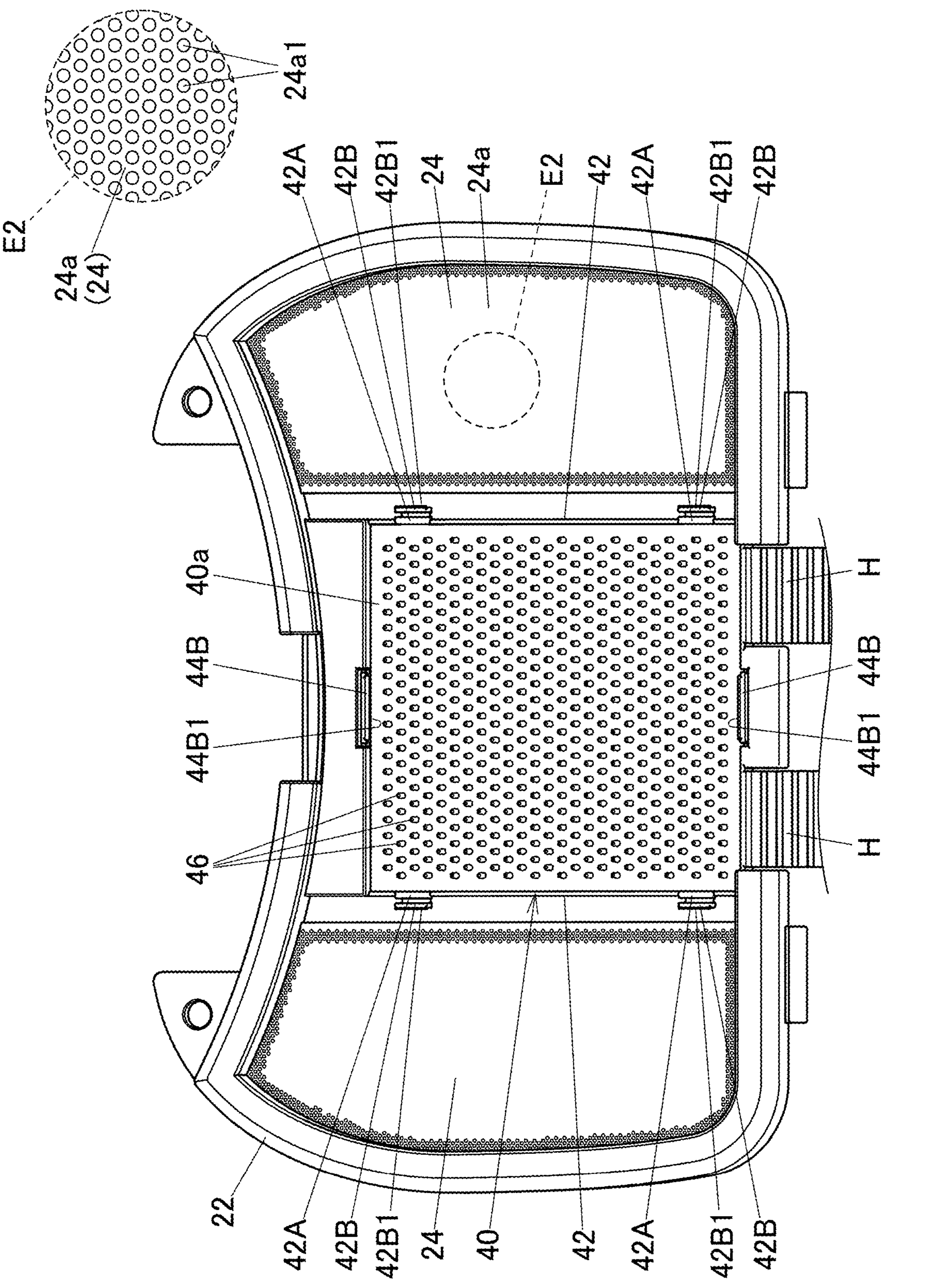
FIG. 5 is an enlarged perspective view of a main body portion as viewed from above.

As shown in FIGS. 2 and 5, on an upper surface 40*a* of the second table 40, upper surface low wall portions 42 each having a low wall height are provided along a front-rear direction on a pair of two sides facing each other in the left-right direction. The upper surface low wall portions 42 are provided with plate guides 42A along the upper surface low wall portions 42. Two plate guides 42A are provided on each of the two upper surface low wall portions 42 at a predetermined interval in the front-rear direction along the upper surface low wall portions 42, for a total of four plate guides 42A. A plate thickness of the plate guide 42A is slightly larger than a thickness of the upper surface low wall portion 42. An inner wall surface of the plate guide 42A is continuous with an inner surface of the upper surface low wall portion 42, and is flush with the inner surface.

A guide plate spring 42B is provided on an outer side of each plate guide 42A at a predetermined interval from the plate guide 42A in the left-right direction. The guide plate spring 42B is provided parallel to the plate guide 42A, and has a plate thickness substantially equal to the thickness of the upper surface low wall portion 42. The guide plate spring 42B is formed in a tapered shape whose plate thickness gradually decreases from a base end toward the upper side, and has a spring property. An engagement protrusion 42B1 slightly protruding outward is provided on an upper portion of an outer surface of each guide plate spring 42B (see FIG. 5).

Substantially plate-shaped regulating plate springs 44B formed to have spring properties are provided at substantially central portions in the left-right direction of a pair of two sides facing each other in the front-rear direction on the upper surface 40*a* of the second table 40. Each regulating plate spring 44B is provided along the left-right direction with both plate surfaces facing in the front-rear direction. A regulating protrusion 44B 1 slightly protruding inward in a hook shape is provided on an upper portion of an inner surface of each regulating plate spring 44B.

A front side of the second table 40 is open by cutting out the frame portion 22, and the pair of hinges H are provided at a predetermined interval in the left-right direction. Each hinge H is formed in a bellows-shaped substantially rectangular sheet shape in which thin portions and thick portions are alternately provided in a connection direction, and is flexible. In the opened state of the first table 30, both hinges H are in a posture with both sheet surfaces facing in an upper-lower direction. A plurality of pins 46 rising upward are provided on the upper surface 40*a* of the second table 40. The plurality of pins 46 are arranged in a staggered rows and columns. Each pin 46 is formed in a substantially truncated cone shape with a reduced diameter on the upper side.

Figure 3:
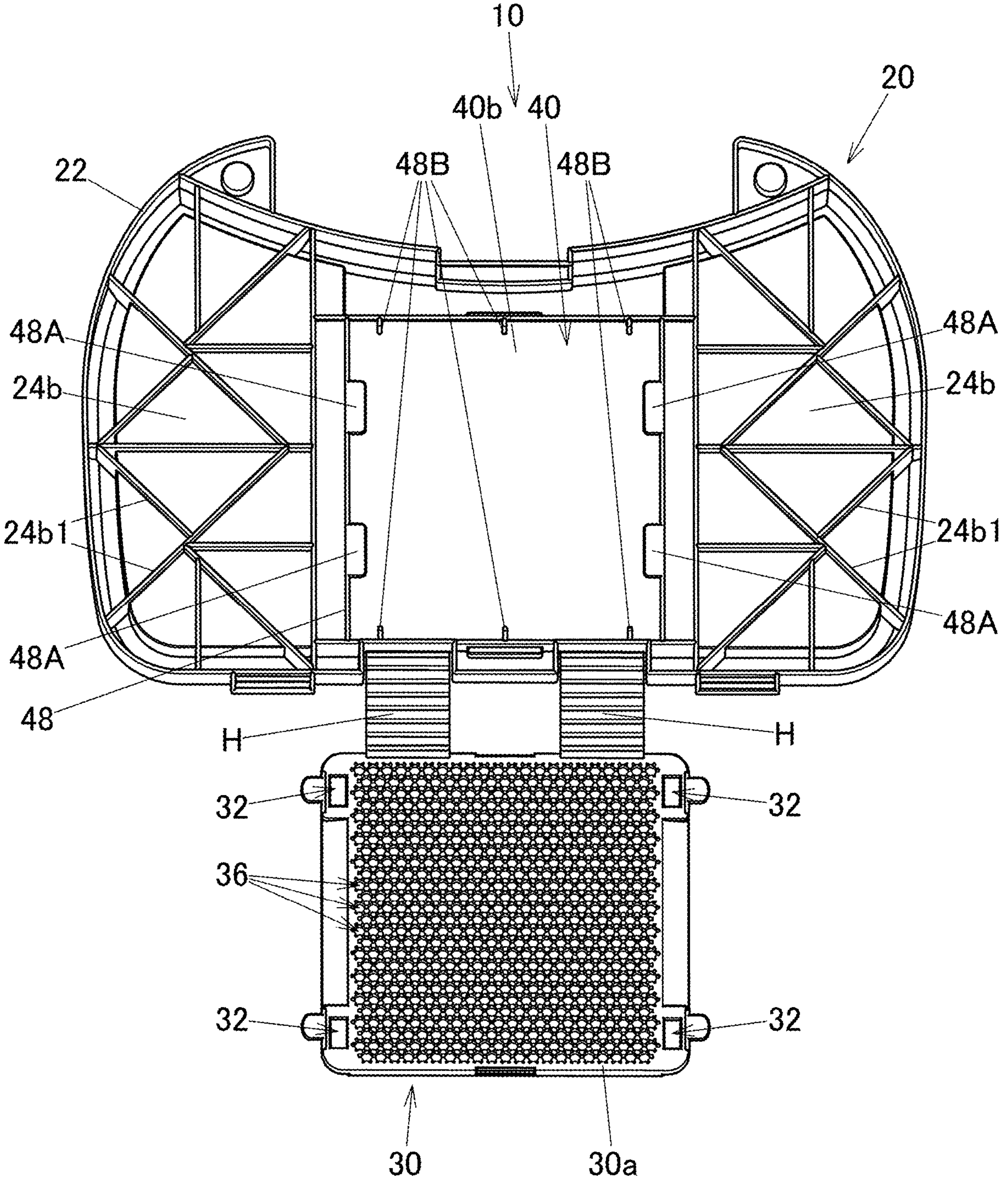
FIG. 3 is a perspective view of the creation table for fusible toy bead according to the embodiment of the disclosure with the first table opened and viewed from below.

As shown in FIG. 3, a lower surface low wall portion 48 having a lower wall height and formed in a substantially rectangular annular wall shape is provided at an outer edge portion of the lower surface 40*b* of the second table 40. The above-described sheet holding plates 48A extending inward in a plate shape from a rising tip end of the lower surface low wall portion 48 are provided on a pair of two sides of the lower surface low wall portion 48 that face each other in the left-right direction. Two sheet holding plates 48A are provided on each of the lower surface low wall portions 48 on both left and right sides at a predetermined interval in the front-rear direction with both plate surfaces facing in the upper-lower direction, for a total of four sheet holding plates 48A.

Further, the above-described sheet holding ribs 48B extending inward in a rib shape from the lower surface low wall portion 48 are provided on a pair of two sides of the lower surface low wall portion 48 that face each other in the front-rear direction. Three sheet holding ribs 48B are provided on each of the lower surface low wall portions 48 on both front and rear sides at predetermined intervals in the left-right direction, for a total of six sheet holding ribs 48B. A tip end of each of the sheet holding ribs 48B has a tapered shape inclined toward the lower surface 40*b* of the second table 40.

When the sheet holding plates 48A and the sheet holding ribs 48B hold substantially square sheet, both front and rear sides of the sheet are placed on the tapered portions of the sheet holding ribs 48B, and both left and right sides of the sheet are inserted between the lower surface 40*b* of the second table 40 and the sheet holding plates 48A. As a result, the sheet is secured to and held on the lower surface 40*b* of the second table 40.

The pair of drying tables 24 are tables for drying the fusible toy beads sprayed with water. A drainage process occurs on an upper surface 24*a* of the drying table 24 through a plurality of substantially circular minute convex portions 24*a*1 as shown in the enlarged view E2 of FIG. 5 (in FIG. 5, the minute convex portions 24*a*1 are shown only at edges of each drying table 24). Moisture generated from the fusible toy beads placed on the drying table 24 drops between the minute convex portions 24*a*1 and evaporates. A plurality of reinforcing ribs 24*b*1 extending in front, rear, left, right, and oblique directions are provided on a lower surface 24*b* of each drying table 24. The main body portion 20 is reinforced by the reinforcing ribs 24*b*1.

Next, the configuration of the first table 30 will be described with reference to FIG. 4. The upper surface 30*a* faces upward in the closed state of the first table 30 (see FIG. 1). Accordingly, in the opened state of the first table 30 (see FIG. 3), the upper surface 30*a* of the first table 30 faces downward and a lower surface 30*b* faces upward. In the first table 30, both left and right sides of the substantially square table surface overhang outward, and guide holes 32, each of which is a rectangular through hole elongated in the front-rear direction, are provided at four corners of the overhanging portion.

A rising portion 34A that rises upward in a wall shape is provided at the outer side of each guide hole 32. An overhang portion 34B, which is bent outward at a substantially right angle and slightly overhangs in a substantially plate shape, is provided at a tip end of each rising portion 34A. A tip end of each overhang portion 34B has a substantially arc shape. An inclined surface 35 is provided between each two of the four guide holes 32 arranged in the front-rear direction. Each inclined surface 35 is formed to be inclined outward from the upper surface 30*a* to the lower surface 30*b* of the first table 30.

The first table 30 is provided with a plurality of through holes 36 that are open in a circular shape and whose penetration direction is the upper-lower direction. In the closed state of the first table 30, each through hole 36 is provided at a position overlapping with each pin 46 provided on the second table 40 in the upper-lower direction. Accordingly, the through holes 36 are arranged in a staggered rows and columns. The opening of each through hole 36 is sized to allow each pin 46 to be inserted therethrough. In other words, each pin 46 is formed so as to be inserted into and removed from each through hole 36. An opening diameter of each through hole 36 is slightly smaller than a diameter of the fusible toy bead. Therefore, the fusible toy bead can be placed on an opening edge of each through hole 36.

Figure 4:
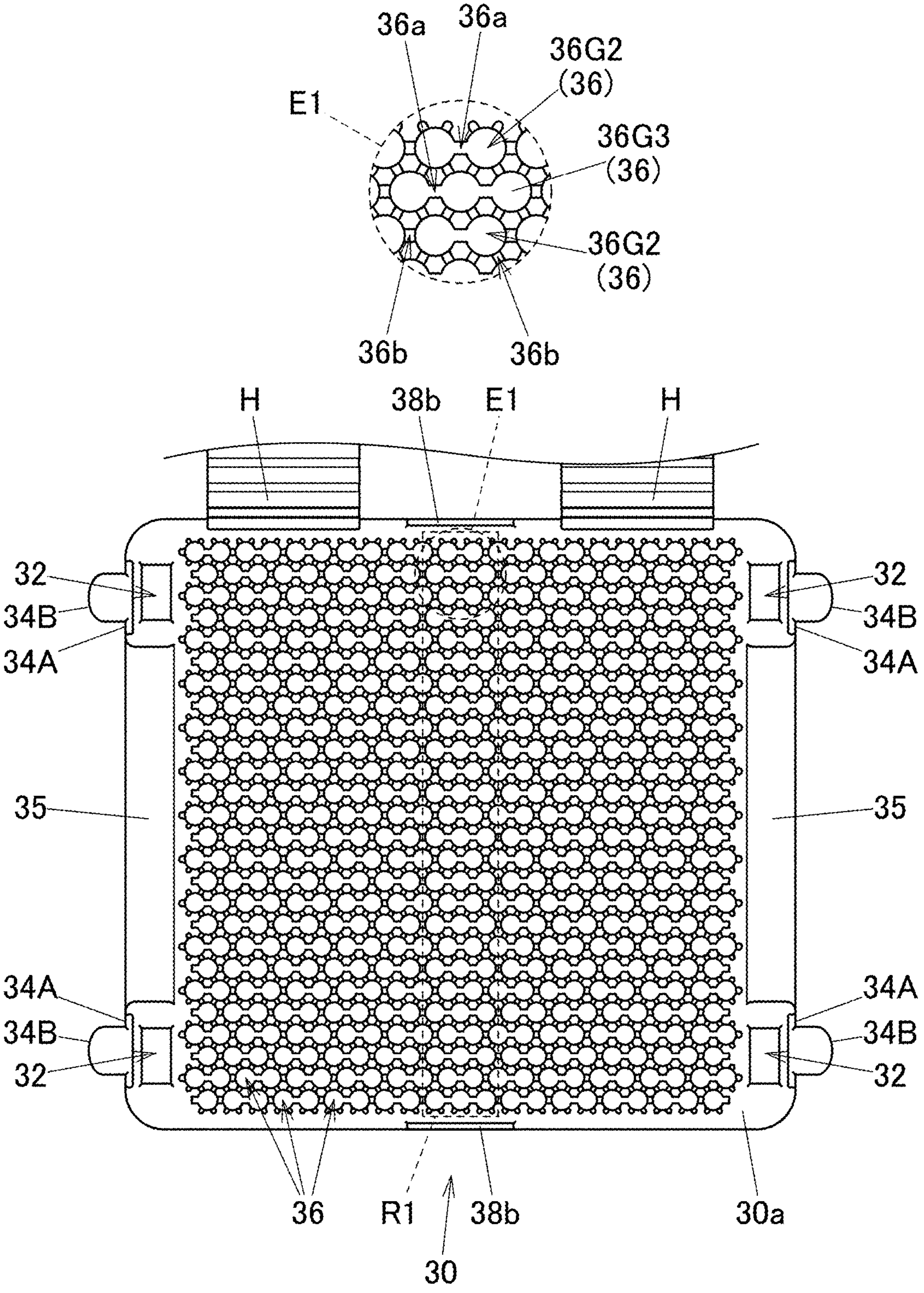
FIG. 4 is an enlarged perspective view of the first table as viewed from above.

As shown in the enlarged view E1 of FIG. 4, two or three adjacent through holes 36 communicate with each other in the left-right direction (one direction in a radial direction of the through hole 36) by a communication groove 36*a* penetrating through the first table 30 in an up-down direction. Specifically, the first table 30 includes, only in a region RI (an example of a first region) on a substantially central side in the left-right direction, a through hole group 36G3 (an example of a first through hole group) in which three through holes 36 communicate with each other, and includes, in other regions (an example of a second region), a through hole group 36G2 (an example of a second through hole group) in which two through holes 36 communicate with each other. In the region RI on the substantially central side, the through hole group 36G2 in which two through holes 36 communicate with each other and the through hole group 36G3 in which three through holes 36 communicate with each other are arranged alternately in a staggered manner in the front-rear direction. A shallow bottomed groove-shaped connection groove 36*b* that connects the through holes 36 is provided between through holes 36 that are not in communication with each other among the adjacent through holes 36. A width of the communication groove 36*a* is smaller than a diameter of the through holes 36.

As shown in FIG. 2, a wall-shaped edge wall 38 is provided on the lower surface 30*b* of the first table 30 and extends downward along an outer edge of the first table 30. Stepped convex portions 38*a* protruding inward are provided at substantially central portions in the left-right direction of two inner wall surfaces of the edge wall 38 that face each other in the front-rear direction, so as to form a step between the lower surface 30*b* of the first table 30 and the stepped convex portion 38*a*. A stepped concave portion 38*b* that is recessed with a step is provided at a portion of the upper surface 30*a* of the first table 30 corresponding to each of the stepped convex portions 38*a* (see FIG. 4). The pair of hinges H described above are connected to an outer edge portion of the upper surface of the first table 30 on both sides of one stepped concave portion 38*b*.

As shown in FIG. 1, the first table 30 and the second table 40 can be combined with each other by bending the pair of hinges H, stacking the lower surface 30*b* of the first table 30 on the upper surface 40*a* of the second table 40, and inserting the guide plate springs 42B and the plate guides 42A through the guide holes 32. An opening edge of the guide hole 32 is guided in proximity to or in contact with an inner side surface of the plate guide 42A and an outer side surface of the guide plate spring 42B. In other words, the guide holes 32, the guide plate springs 42B, and the plate guides 42A guide the first table 30 and the second table 40 in the upper-lower direction so that they can approach and separate from each other.

As shown in FIG. 1, an upward movement of the first table 30 is regulated by each stepped concave portion 38*b* being engaged with each regulating plate spring 44B and in contact with the regulating protrusion 44B1. The first table 30 is configured such that the guide holes 32 are positioned above the engagement protrusions 42B1 of the guide plate springs 42B when the guide plate springs 42B and the plate guides 42A are inserted into the guide holes 32 and before the stepped concave portions 38*b* come into contact with the regulating protrusions 44B1. In this state, the engagement protrusions 42B1 come into contact with an edge portion of the guide hole 32, so that a state is maintained in which the first table 30 and the second table 40 are separated from each other by a predetermined interval in the upper-lower direction, and each pin 46 is removed from each through hole 36.

Next, a method of creating an assembly of fusible toy beads using the fusible toy bead creation table 10 will be described. First, the first table 30 is stacked on the second table 40, the first table 30 and the second table 40 are separated from each other by a predetermined interval in the upper-lower direction, and each pin 46 is removed from each through hole 36. In this state, the sheet holding plates 48A and the sheet holding ribs 48B of the second table 40 hold a sheet on which any design is illustrated. Next, among the through holes 36 of the first table 30, a plurality of fusible toy beads are placed on the through holes 36 (through holes 36 overlapping the design) corresponding to the design illustrated on the sheet.

At this time, since the upper surface 40*a* of the second table 40 is exposed in a portion of the first table 30 where the through hole 36 does not overlap the pin 46 and a portion of the first table 30 where the communication groove 36*a* is provided, the sheet held on the lower surface 40*b* of the second table 40 can be visually recognized more clearly from above the first table 30 compared to other portions of the first table 30. Therefore, the fusible toy beads can be effectively placed on the through holes 36 according to any design illustrated on the sheet.

In a state where the fusible toy bead is placed on the through hole 36, a tip end of the pin 46 and the fusible toy bead are not in contact with each other and are separated from each other. After a plurality of fusible toy beads are placed, water is sprayed onto the plurality of fusible toy beads using a sprayer or the like. The water sprayed onto the first table 30 is stored on the second table 40 through the connection groove 36*b*, the communication groove 36*a*, and the through hole 36, the water hardly overflows and falls from a surface of the first table 30 to the outside of the fusible toy bead creation table 10. The wet and unnecessary fusible toy beads can be rolled on the inclined surfaces 35 on both sides of the first table 30 and moved to each drying table 24, and can be effectively dried on the drying table 24.

Next, when the first table 30 is pushed toward the second table 40 side by pushing the overhang portions 34B downward with both hands or the like, the first table 30 approaches the second table 40. At this time, the guide plate spring 42B springs and warps toward the plate guide 42A at the edge of the guide hole 32 that comes into contact with the engagement protrusion 42B 1. Accordingly, the guide hole 32 can pass over the engagement protrusion 42B1. When the guide hole 32 passes over the engagement protrusion 42B1, a tip end (lower end) of the edge wall 38 comes into contact with the upper surface 40*a* of the second table 40, and an downward movement of the first table 30 is regulated.

When the tip end portion of the edge wall 38 comes into contact with the upper surface 40*a* of the second table 40, a tip end of each pin 46 passes through each through hole 36 and comes into contact with a fusible toy bead from below, and the fusible toy bead is relatively pushed up with respect to an upper opening edge of each through hole 36. The fusible toy bead is separated from the upper opening edge of each supported through hole 36 for supporting, and the support by each through hole 36 is released. At this time, the plurality of fusible toy beads are connected to such an extent that they can be held by a hand. Therefore, the plurality of fusible toy beads, which are no longer supported by the through holes 36 and are supported by the tip ends of the pins 46, are lifted by the hand and removed from the fusible toy bead creation table 10, and an assembly of the fusible toy beads is completed.

As described above, in the fusible toy bead creation table 10 according to the embodiment of the present disclosure, when a fusible toy bead is placed on the through hole 36 of the first table 30, the second table 40 can be directly viewed from above the first table 30 not only through an empty portion of the through hole 36 but also through the communication grooves 36*a*. Therefore, compared to a configuration in which the through holes 36 are all separated and the communication groove 36*a* is not provided, for example, an area where the second table 40 is exposed increases by the amount that the communication groove 36*a* is provided, so that a design held on the lower surface 40*b* of the second table 40 can be visually recognized more clearly, and the fusible toy beads can be effectively placed according to the design. As described above, in the embodiment of the present disclosure, it is possible to implement the fusible toy bead creation table 10 on which fusible toy beads are easily placed according to the design.

In addition, the fusible toy bead creation table 10 can be manufactured by integral molding using one mold, so that the manufacturing cost can be reduced as compared with a fusible toy bead creation table manufactured through a plurality of molding steps, and the cost can be reduced.

According to the embodiment of the present disclosure described above, it is possible to provide a creation table for fusible toy bead of the following aspects.

A creation table for fusible toy bead according to a first aspect includes: a first table having a plurality of through holes extending in a penetrating direction and configured to allow fusible toy beads to be placed on one side of the plurality of through holes in the penetration direction; and a second table including: a plurality of pins configured to be inserted into and removed from the plurality of through holes from another side of the plurality of through holes in the penetration direction; and a sheet holding portion configured to hold a sheet, in which: the plurality of through holes include at least one through hole group, each of the at least one through hole group having two or more through holes; and the first table has a communication groove penetrating through the first table in the penetrating direction such that adjacent through holes contained in each of the at least one through hole group communicate with each other in a radial direction of the adjacent through holes.

According to this configuration, when a fusible toy bead is placed on a through hole of the first table 30 with the first table stacking on the second table, the second table can be directly viewed from above the first table not only through an empty portion of the through hole, but also through a groove portion that communicates the adjacent through holes. Therefore, as compared with a configuration in which the adjacent through holes do not communicate with each other, the sheet on which a design or the like is illustrated held in the sheet holding portion of the second table can be visually recognized more clearly, and thus it is possible to implement the creation table for fusible toy bead on which a fusible toy bead is easily placed according to the design.

In the creation table for fusible toy bead according to a second aspect, the at least one through hole group include at least one first through hole group and at least one second through hole group, and a number of through holes contained in each of the at least one first through hole group is different from a number of through holes contained in each of the at least one second through hole group.

According to this configuration, the through hole groups with different number of through holes can be disposed in appropriate positions of the first table in consideration of the strength of the first table and/or the visibility of the sheet.

In the creation table for fusible toy bead according to a third aspect, the two or more through holes contained in each of the at least one through hole group are arranged in one direction of the radial direction, the number of through holes contained in each of the at least one first through hole group is three, and the number of through holes contained in each of the at least one second through hole group is two.

According to this configuration, while ensuring the strength of the first table, it is possible to provide a specific configuration regarding the number of the communicating through holes to make it easier to visually recognize the sheet or the like held by the sheet holding portion of the second table.

In the creation table for fusible toy bead according to a fourth aspect, the first table includes a first region including a center of the first table in the one direction and a second region outside the first region in the one direction, the at least one first through hole group is disposed only in the first region, and the at least one second through hole group is disposed in at least the second region.

In order to ensure the strength of the first table, it is necessary to increase the strength of an outer edge portion rather than the substantially central portion of the first table. According to this configuration, it is possible to provide a specific arrangement mode of two communicating through holes and three communicating through holes in order to make it easy to visually recognize the sheet or the like held by the sheet holding portion of the second table while ensuring the strength of the first table.

In the creation table for fusible toy bead according to a fifth aspect, a width of the communication groove is smaller than a diameter of each of the plurality of through holes.

According to this configuration, it is possible to improve the visibility of the sheet heled by the sheet holding portion of the second table while ensuring the strength of the first table.

The creation table for fusible toy bead according to a sixth aspect further includes a hinge configured to connect the first table and the second table such that the first table and the second table are allowed to be stacked while the plurality of pins are inserted into the plurality of through holes.

According to this configuration, since the first table and the second table are connected by the hinge and are not separated from each other, it is possible to prevent the first table from being separated from the second table and being lost.

Although the embodiment of the present disclosure has been described above, the present disclosure is not limited to the above embodiment, and various modifications can be made without departing from the scope thereof. For example, in the embodiment described above, a configuration in which two or three adjacent through holes communicate with each other is exemplified, but the number of the through holes to be communicated is not limited thereto. As long as the strength of the first table can be maintained, the area where the second table is exposed increase if more communication grooves are provided. Therefore, the larger the number of communicating through holes, the more clearly the sheet or the like held by the holding portion can be visually recognized from above the first table. Further, in the embodiment described above, a configuration in which the width of the communication groove 36*a* is smaller than the diameter of the through holes 36 is exemplified, but the width of the communication groove 36*a* may be equal to or larger than the diameter of the through holes 36. As the width of the communication groove 36*a* is made smaller, the influence on the strength of the first table 30 is more reduced, and as the width of the communication groove 36*a* is made larger, the visibility of the sheet is more improved.

What is claimed is:

1. A creation table for fusible toy bead comprising:

a first table having a plurality of through holes extending in a penetrating direction and configured to allow fusible toy beads to be placed on one side of the plurality of through holes in the penetration direction; and a second table comprising: a plurality of pins configured to be inserted into and removed from the plurality of through holes from another side of the plurality of through holes in the penetration direction; and a sheet holding portion configured to hold a sheet, wherein the plurality of through holes include at least one through hole group, each of the at least one through hole group having two or more through holes, and wherein the first table has a communication groove penetrating through the first table in the penetrating direction such that adjacent through holes contained in each of the at least one through hole group communicate with each other in a radial direction of the adjacent through holes.

2. The creation table for fusible toy bead according to claim 1, wherein the at least one through hole group comprise at least one first through hole group and at least one second through hole group, and wherein a number of through holes contained in each of the at least one first through hole group is different from a number of through holes contained in each of the at least one second through hole group.

3. The creation table for fusible toy bead according to claim 2, wherein the two or more through holes contained in each of the at least one through hole group are arranged in one direction of the radial direction, wherein the number of through holes contained in each of the at least one first through hole group is three, and wherein the number of through holes contained in each of the at least one second through hole group is two.

4. The creation table for fusible toy bead according to claim 3, wherein the first table includes a first region including a center of the first table in the one direction and a second region outside the first region in the one direction, wherein the at least one first through hole group is disposed only in the first region, and wherein the at least one second through hole group is disposed in at least the second region.

5. The creation table for fusible toy bead according to claim 1, wherein a width of the communication groove is smaller than a diameter of each of the plurality of through holes.

6. The creation table for fusible toy bead according to claim 1, further comprising:

a hinge configured to connect the first table and the second table such that the first table and the second table are allowed to be stacked while the plurality of pins are inserted into the plurality of through holes.

* * * * *